United States Patent
Weldon

(10) Patent No.: US 6,598,623 B2
(45) Date of Patent: Jul. 29, 2003

(54) FUEL TANK PRESSURE CONTROL VALVE

(75) Inventor: Craig W. Weldon, Chatham (CA)

(73) Assignee: Siemens Automotive Inc. (CA)

( * ) Notice: Subject to any disclaimer, the term of this patent is extended or adjusted under 35 U.S.C. 154(b) by 42 days.

(21) Appl. No.: 09/923,795

(22) Filed: Aug. 8, 2001

(65) Prior Publication Data

US 2002/0026960 A1 Mar. 7, 2002

Related U.S. Application Data

(60) Provisional application No. 60/237,879, filed on Oct. 4, 2000, provisional application No. 60/232,348, filed on Sep. 14, 2000, and provisional application No. 60/223,760, filed on Aug. 8, 2000.

(51) Int. Cl.[7] ............................................... F16K 1/52
(52) U.S. Cl. ............. 137/630.15; 137/495; 251/129.02; 251/129.19
(58) Field of Search .................... 137/629, 630.14, 137/630.15, 630.19; 251/129.02, 129.19

(56) References Cited

U.S. PATENT DOCUMENTS 3,563,274 A * 2/1971 Tischler ................ 137/630.14
3,759,584 A * 9/1973 Klimek ........................ 303/71
5,228,597 A * 7/1993 Low ...................... 137/630.15
5,390,703 A * 2/1995 Tengesdal .................. 137/629
6,047,718 A * 4/2000 Konsky et al. ......... 251/129.15

* cited by examiner

Primary Examiner—Stephen M. Hepperle

(57) ABSTRACT

A valve structure that includes a housing, a valve, a first resilient element, and a second resilient element. The housing includes a first fluid communication path between a first port and a second port. The valve is movable with respect to the housing, and includes a first valve element and a second valve element. The first valve element includes a second fluid communication path, a first seal, and a second seal. The second fluid communication path provides restricted fluid flow between the first and second ports. The first seal engages the housing. The second valve element is positionable between first and second arrangements with respect to the first valve element. The first arrangement of the second valve is spaced from the second seal, and the second arrangement of the second valve engages the second seal. The first resilient element extends between the housing and the first valve element, and the second resilient element extends between the first and second valve elements.

22 Claims, 1 Drawing Sheet

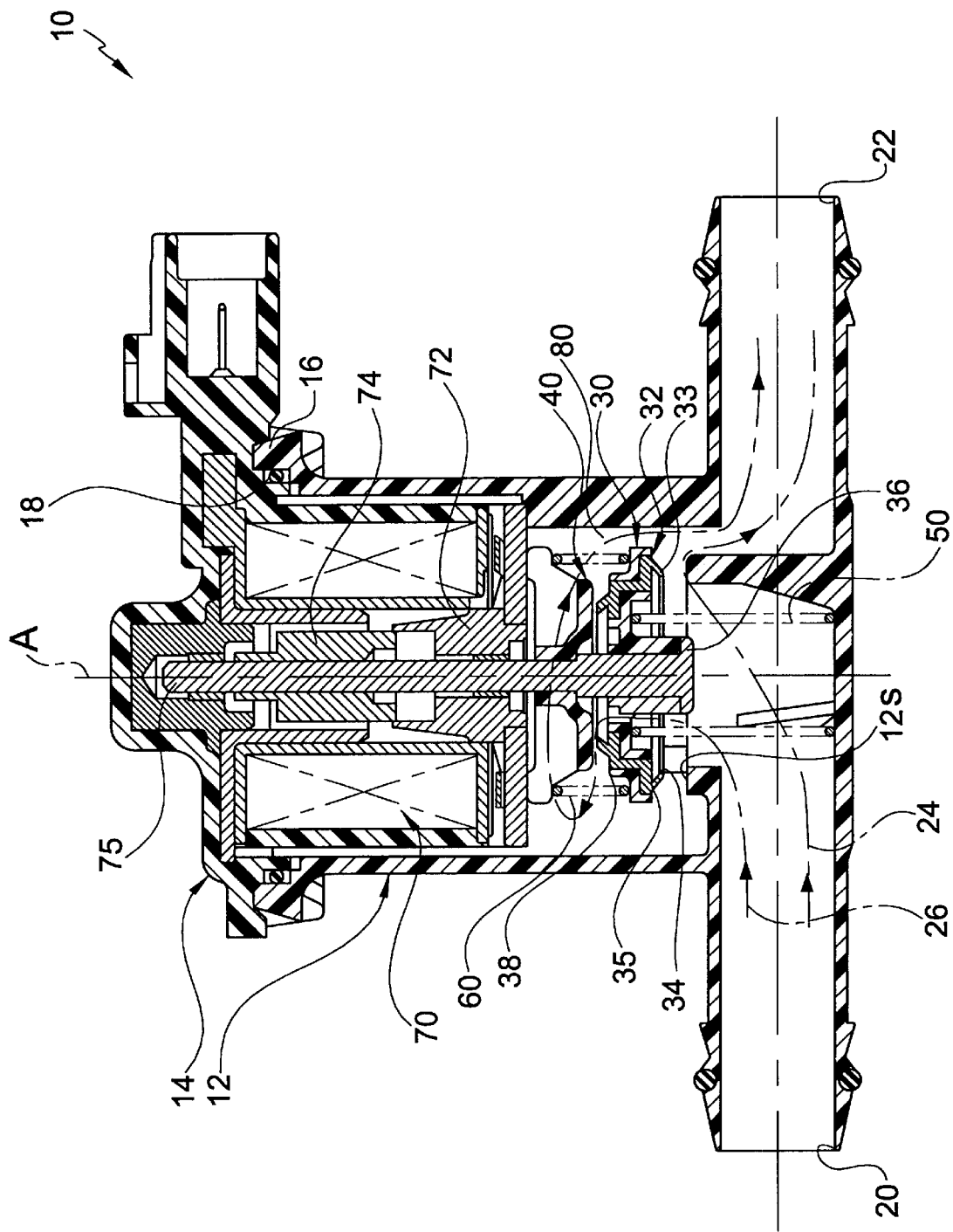

FUEL TANK PRESSURE CONTROL VALVE

CLAIM FOR PRIORITY

This application claims the benefit of the earlier filing dates of U.S. Provisional Application Nos. 60/223,760 (filed Aug. 8, 2000), 60/232,348 (filed Sep. 14, 2000), and 60/237,879 (filed Oct. 4, 2000), which are hereby incorporated by reference in their entirety. This application also claims the benefit of U.S. patent application Ser. No. 09/863,756 (filed May 24, 2001).

FIELD OF THE INVENTION

This disclosure generally relates to a pressure control valve. In particular, this disclosure is directed to an electrically operated valve to control the level of vapor pressure in a fuel tank of a vehicle.

BACKGROUND OF THE INVENTION

It is believed that prior to legislation requiring vehicles to store hydrocarbon vapors that are generated when refueling a vehicle, a simple orifice structure was used to maintain a positive pressure in a fuel tank to retard vapor generation. It is believed that such orifice structures could no longer be used with the advent of requirements controlling on-board refueling. It is believed that, on some vehicles, the orifice structure was simply deleted, and on other vehicles, the orifice structure was replaced with a diaphragm-actuated pressure relief valve. It is believed that these diaphragm-actuated valves suffer from a number of disadvantages including that the calibration (i.e., pressure blow-off level) changes with temperature and age.

It is believed that it is necessary on some vehicles to maintain an elevated pressure in the fuel tank to suppress the rate of fuel vapor generation and to minimize hydrocarbon emissions to the atmosphere. It is believed that under hot ambient temperature conditions or when the fuel is agitated, e.g., when a vehicle is operated on a bumpy road, the amount of fuel vapor generated can exceed the amount of fuel vapor that can be purged by the engine. It is believed that a carbon canister can become hydrocarbon saturated if these conditions occur and are maintained for an extended period. It is believed that such a hydrocarbon saturated carbon canister is unable to absorb the additional fuel vapors that occur during vehicle refueling, and that hydrocarbon vapors are released into the atmosphere. A legislated standard has been set for the permissible level of free hydrocarbons that may be released. A so-called "shed test" is used to measure the emission of the free hydrocarbons for determining compliance with the legislative standard.

It is believed that there is needed to provide a valve that overcomes the drawbacks of orifice structures and diaphragm-actuated pressure relief valves.

SUMMARY OF THE INVENTION

The present invention provides a valve structure that comprises a housing, a valve, a first resilient element, and a second resilient element. The housing includes a first fluid communication path between a first port and a second port. The valve is movable with respect to the housing, and includes a first valve element and a second valve element. The first valve element includes a second fluid communication path, a first seal, and a second seal. The second fluid communication path provides restricted fluid flow between the first and second ports. The first seal engages the housing. The second valve element is positionable between first and second arrangements with respect to the first valve element. The first arrangement of the second valve is spaced from the second seal, and the second arrangement of the second valve engages the second seal. The first resilient element extends between the housing and the first valve element, and the second resilient element extends between the first and second valve elements.

The present invention also provides a valve structure that comprises a housing and a valve. The housing includes a first communication path between a first port and a second port. The valve is movable with respect to the housing between a first configuration, a second configuration, and an intermediate configuration between the first and second configurations. The first configuration permits substantially unrestricted fluid flow between the first and second ports. The second configuration substantially prevents fluid flow between the first and second ports. The intermediate configuration provides restricted fluid flow between the first and second ports. The valve includes a first valve element and a second valve element. The first valve element includes a second fluid communication path, a first seal, and a second seal. The second fluid communication path provides the restricted flow between the first and second ports. The first seal engages the housing in the second and intermediate configurations. A second valve element is positionable between first and second arrangements with respect to the first valve element. The first arrangement of the second valve is spaced from the second seal in the intermediate configuration, and the second arrangement of the second valve engages the second seal in the second configuration.

The present invention further provides a valve for controlling fuel vapor pressure in a fuel tank. The valve comprises a housing, an actuator, a first valve element, a second valve element, a first resilient element, and a second resilient element. The housing includes an inlet port and an outlet port. The actuator includes a stator and an armature. The stator is fixed with respect to the housing, and the armature is displaceable along an axis with respect to the stator. The first valve element includes a first disk. The first valve element is fixed with respect to the armature and displaceable along the axis with respect to the housing. The second valve element includes a second disk and at least one aperture, which penetrates the second disk and extends generally parallel to the axis. The second valve element is displaceable along the axis with respect to the housing and the first valve element. The first resilient element extends between the housing and the second valve element and opposes an actuating force of the actuator. The second resilient element extends between the first and second valve elements and opposes displacement of the second body toward the first body. There are a plurality of configurations of the first and second valve elements with respect to the housing. A first configuration permits substantially unrestricted fluid flow from the inlet port to the outlet port. In the first configuration, the second valve element is spaced from the housing such that fluid communication is permitted between the inlet and outlet ports through a gap between the second disk and the housing. Also in the first configuration, the first valve element is spaced from the second valve element such that fluid communication is permitted between the inlet and outlet ports through the at least one aperture penetrating the second disk. A second configuration substantially prevents fluid flow from the inlet port to the outlet port. In the second configuration, the second valve element engages the first valve element such that fluid communication between the inlet and outlet ports is prevented through the at least one aperture penetrating the second disk. A third configuration provides restricted fluid flow from the inlet port to the outlet port. In the third configuration, the second valve element engages the housing such that the gap is closed. Also in the third configuration, the first valve element is spaced from the second valve element such that fluid communication is permitted between the inlet and outlet ports through the at least one aperture penetrating the second disk.

BRIEF DESCRIPTION OF THE DRAWINGS

The accompanying drawing, which is incorporated herein and constitutes part of this specification, illustrates an embodiment of the invention, and, together with the general description given above and the detailed description given below, serves to explain the features of the invention.

The FIGURE is a sectional view of a fuel tank pressure control valve in a first configuration wherein fluid flow is permitted through a first fluid communication path and a second fluid communication path.

DETAILED DESCRIPTION OF THE PREFERRED EMBODIMENT

A fuel tank pressure control valve 10 can be located along a vapor line (not shown) connecting a fuel vapor dome, i.e., the gaseous portion within a fuel tank (not shown), and a charcoal canister (not shown). A canister purge control valve (not shown) can be used to purge hydrocarbons that have been collected in the charcoal canister (not shown). Typically, the hydrocarbons that are purged from the charcoal canister are combusted by an internal combustion engine (not shown).

A vapor dome pressure level that is approximately 10" water above atmospheric pressure has been determined to suppress fuel vapor generation in the fuel tank (not shown). A fuel tank pressure sensor (not shown) can be used to detect pressures in excess of this determined level. When excess pressure is detected, the fuel tank pressure control valve 10 is supplied an electrical signal which results in the fuel tank pressure control valve 10 opening to decrease pressure to or slightly below the determined level.

The fuel tank pressure control valve 10 includes a housing and a valve assembly 80. The housing can include a body 12 and a cover 14. The body 12 and the cover 14 can be made of any material that is suitable for contacting and containing fuel and/or fuel vapor and for housing an actuator 70. The body 12 and cover 14 can be made of different materials or the same material, as long as the material is suitable for its intended purpose. The body 12 and cover 14 can be a homogenous whole or separate components coupled together, for example, by an interlocking flange assembly. Preferably, the body 12 and cover 14 are separate components coupled together by an interlocking flange assembly 16. Alternative coupling techniques can be substituted for the interlocking flange assembly 16. A rubber O-ring 18 can provide a fluid-tight seal, which is impermeable to hydrocarbon migration, between the body 12 and the cover 14. Alternative sealing means, e.g., a gasket, can be substituted for the O-ring 18. The housing can be two separate halves of the body 12 and the cover 14 divided along an axis A. Preferably, the housing is as described above.

The body 12 includes an inlet port 20 for ingress of fuel vapor from the fuel tank (not shown) and an outlet port 22 for egress of fuel vapor to the carbon canister (not shown). Fluid communication between the inlet port 20 and the outlet port 22 can be through a first fluid communication path 24 and a second fluid communication path 26. Fluid flow through the first and second fluid communication paths 24, 26 is controlled by the valve assembly 80. As used herein, the term "fluid" can refer to a gaseous phase, a liquid phase, or a mixture of the gaseous and liquid phases. The term "fluid" preferably refers to the gaseous phase, i.e., fuel vapor.

The valve assembly 80 includes a distal valve element 30 and a proximate valve element 40, which are movable along the axis A with respect to the housing between an open configuration and a closed configuration. As used herein, the terms "distal" and "proximate" refer to positions within the valve 10 with respect to an actuator 70. As shown in the FIGURE, the open configuration permits substantially unrestricted fluid flow between the inlet and outlet ports 20, 22. The closed configuration (not shown) substantially isolates fluid flow between the inlet and outlet ports 20, 22.

The distal valve element 30 can include at least one orifice 38 and a homogenous seal 32. Alternatively, the seal 32 can include separate seal elements or a single seal element disposed at an interface 12s between the housing and the valve assembly 80. Preferably, the seal 32 is a homogenous whole. The at least one orifice 38 provides a flow path between the inlet and outlet ports 20, 22 in the open configuration and an intermediate configuration. The seal 32 includes annular extension 33 projecting obliquely with respect to the axis A in the open configuration. The annular extension 33 can be a hollow frustum. In the case of the hollow frustum, an inner surface 34 of the hollow frustum generally confronts the axis A, and an outer surface 35 of the hollow frustum generally faces opposite the inner surface 34. The inner surface 34 is in fluid communication with the inlet port 20 when the valve assembly 80 is at the intermediate configuration. The outer surface 35 is in fluid communication with the outlet port 22 when the valve assembly 80 is at the intermediate configuration. The seal 32 engages the housing in the closed and intermediate configurations. A flange 36 is fixed to a shaft 75 to which armature 74 is also coupled. The distal valve element 30 is positionable with respect to the proximate valve element 40.

The proximate valve element 40 is fixed with respect to the armature 74 and is displaceable along the axis A with respect to the housing and between an open position and a closed position with respect to the distal valve element 30. In the open position, the proximate valve element 40 is spaced from the seal 32. In the closed position, the proximate valve element 40 engages the seal 32 in the closed configuration. The open configuration includes the open position of the distal valve element 30 and the proximate valve element 40.

A distal resilient element 50, e.g., a coil spring that can be centered around the axis A, extends between the distal valve element 30 and an internal wall of the body 12. The distal resilient element 50 biases the distal valve element 30 toward the open configuration in opposition to the actuating force of the actuator 70.

A proximate resilient element 60, e.g., a coil spring that can be centered around the axis A, extends between the distal valve element 30 and the proximate valve element 40. Thus, the distal and proximate resilient elements 50, 60 can have coincidental central axes. The proximate resilient element 60 biases the distal valve element 30 away from the proximate valve element 40. The proximate resilient element 60 biases the distal valve element 30 and the proximate valve element 40 toward the open position. A biasing force of the proximate resilient element 60 is greater than a biasing force of the distal resilient element 50.

The actuator 70 includes a stator 72 and the armature 74. For example, the actuator 70 can be electromagnetic, piezoelectric, or any other type of actuator. Preferably, the actuator 70 is an electromagnetic solenoid. The actuator 70 displaces the valve assembly 80 from the open configuration to the closed configuration. The armature 74 is operatively connected to the valve assembly 80 and provides a first magnetic pole. The stator 72 provides a second magnetic pole to which the first magnetic pole can be attracted. The stator 72 is fixed with respect to the body 12, and the armature 74 is displaceable along the axis A with respect to the stator 72. The stator 72 supports a bearing that guides the shaft 75 which connects the armature 74 and the proximate valve element 40.

There are a plurality of configurations of the distal and proximate valve elements 30, 40 with respect to the housing. The open configuration, as shown in the FIGURE, permits substantially unrestricted fluid flow from the inlet port 20 to the outlet port 22. In the open configuration, the distal valve element 30 is spaced from the body 12 such that fluid communication is permitted through the first fluid communication path 24 through a gap between the distal valve element 30 and the body 12, and through the second fluid communication path 26 through the at least one orifice 38 penetrating the distal valve element 30.

The closed configuration (not shown) substantially isolates fluid flow from the inlet port 20 to the outlet port 22. In the closed configuration (not shown), the distal seal 32 engages an internal surface of the body 12 such that the gap of the first fluid communication path 24 is closed. The proximate valve element 40 engages the seal 32, thus preventing flow through the at least one orifice 38. In particular, the proximate valve element 40 is positioned with respect to the distal valve element 30 such that the first and second fluid communication paths 24, 26 are closed. To achieve this position, the proximate valve element 40 is displaced by the actuator 70 along the axis A toward the distal valve element 30.

In the closed configuration, if fuel tank pressure becomes too large, e.g., through burst pressure, agitation, hot ambient conditions, etc., the distal and proximate valve elements 30, 40 permit flow of fuel vapor from the inlet port 20 to the outlet port 22. The release of pressure provides a blow-off feature. This is achieved because the pressure acting on the distal and proximate valve elements 30, 40 is greater than the force of the actuator 70, the proximate resilient element 60, and the distal resilient element 50. When this occurs, the distal valve element 30 is spaced from the body 12 and the proximate valve element 40 is spaced from the distal valve element 30. Thus, fluid communication is permitted through the gap and the at least one orifice 38.

The intermediate configuration (not shown) provides restricted fluid flow from the inlet port 20 to the outlet port 22. In the intermediate configuration, the distal seal 32 engages the body 12 such that the gap is closed, and the proximate valve element 40 is positioned away from the proximate seal 34 such that fluid communication is permitted through the second fluid communication path 26, i.e., through the at least one orifice 38. The intermediate configuration occurs at an intermediate position between the open and closed configurations.

The actuator 70, e.g., an electromagnetic solenoid, operates through a power device, which can be a constant current driver or a pulse-width-modulated signal, such that there is an approximately fifty percent power level when the valve 10 is in the intermediate configuration. Thus, when the actuator 70 is not energized, the first and second fluid communication paths 24, 26 allow fluid flow therethrough. This also provides a fail-safe condition such that fuel vapor build-up is prevented in the fuel tank. At an approximately zero percent power level, the valve 10 is in the open configuration, and at an approximately one hundred percent power level, the valve 10 is in the closed configuration.

This fuel tank pressure control valve 10 provides low flow restriction during fuel tank re-fueling (i.e., in the open configuration), fails to an open state (i.e., the open configuration), and provides restricted flow during routine vehicle operation to ensure that a sufficient vapor pressure is maintained to suppress additional fuel vapor generation (i.e., the intermediate configuration). During carbon canister purging (i.e., the closed configuration) excess hydrocarbons stored in the canister are purged to an internal combustion engine. Thus, fuel tank pressure control valve 10 isolates the fuel tank, thereby preventing the purging directly from the evaporative emission space of the fuel tank. Isolating the fuel tank, therefore, prevents or reduces the amount of hydrocarbons in tail-pipe emissions.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A valve structure comprising:
   a housing including a first fluid communication passage between a first port and a second port;
   a valve movable with respect to the housing, the valve including:
      a first valve element including a second fluid communication passage, a first seal, and a second seal, the second fluid communication passage providing restricted fluid flow between the first and second ports, and the first seal engaging the housing; and
      a second valve element positionable between first and second arrangements with respect to the first valve element, the first arrangement of the second valve being spaced from the second seal, and the second arrangement of the second valve engaging the second seal;
   a first resilient element extending between the housing and the first valve element; and
   a second resilient element extending between the first and second valve elements.

2. The valve structure according to claim 1, wherein the first and second resilient elements comprise coil springs having coincidental central axes, and the second resilient element comprises a greater spring rate than the first resilient element.

3. The valve structure according to claim 1, further comprising:
   an actuator displacing the valve against the bias of the first resilient element.

4. The valve structure according to claim 3, wherein the actuator comprises an electromagnetic solenoid.

5. The valve structure according to claim 1, wherein the valve is movable along an axis, and at least one of the first and second seals comprises an annular lip projecting obliquely toward the axis in the first configuration.

6. The valve structure according to claim 5, wherein the annular lip comprises a hollow frustum.

7. The valve structure according to claim 1, wherein the second fluid communication passage comprises at least one orifice penetrating the first valve element and providing the restricted fluid flow between the first and second ports.

8. A valve structure comprising:
   a housing including a first fluid communication passage between a first port and a second port;
   a valve movable with respect to the housing between a first configuration, a second configuration, and an intermediate configuration between the first and second configurations, the first configuration permitting substantially unrestricted fluid flow between the first and second ports, the second configuration substantially preventing fluid flow between the first and second ports, and the intermediate configuration providing restricted fluid flow between the first and second ports, the valve including;
      a first valve element including a second fluid communication passage, a first seal, and a second seal, the second fluid communication passage providing the restricted fluid flow between the first and second ports, and the first seal engaging the housing in the second and intermediate configurations; and
      a second valve element positionable between first and second arrangements with respect to the first valve element, the first arrangement of the second valve being spaced from the second seal in the intermediate configuration, and the second arrangement of the second valve engaging the second seal in the second configuration; and
   a first resilient element biasing the valve toward the first configuration.

9. The valve structure according to claim 8, further comprising:
   an actuator displacing the valve against the bias of the first resilient element.

10. The valve structure according to claim 9, wherein the actuator comprises an electromagnetic solenoid.

11. The valve structure according to claim 8, further comprising:
   a second resilient element biasing the first and second valve members toward the first arrangement.

12. The valve structure according to claim 11, wherein the second resilient element comprises a greater biasing rate than the first resilient element.

13. The valve structure according to claim 11, wherein the first and second resilient elements comprise coil springs having coincidental central axes.

14. The valve structure according to claim 11, wherein the first resilient element extends between the housing and the first valve element, and the second resilient element extends between the first and second valve elements.

15. A valve structure comprising:
   a housing including a first fluid communication passage between a first port and a second port; and
   a valve movable with respect to the housing between a first configuration, a second configuration, and an intermediate configuration between the first and second configurations, the first configuration permitting substantially unrestricted fluid flow between the first and second ports, the second configuration substantially preventing fluid flow between the first and second ports, and the intermediate configuration providing restricted fluid flow between the first and second ports, the valve including:
      a first valve element including a second fluid communication passage, a first seal, and a second seal, the second fluid communication passage providing the restricted fluid flow between the first and second ports, and the first seal engaging the housing in the second and intermediate configurations; and
      a second valve element positionable between first and second arrangements with respect to the first valve element, the first arrangement including the second valve being spaced from the second seal in the first configuration, and the second arrangement including the second valve engaging the second seal in the second configuration.

16. A valve structure comprising:
   a housing including a first fluid communication passage between a first port and a second port; and
   a valve movable along an axis with respect to the housing between a first configuration, a second configuration, and an intermediate configuration between the first and second configurations, the first configuration permitting substantially unrestricted fluid flow between the first and second ports, the second configuration substantially preventing fluid flow between the first and second ports, and the intermediate configuration providing restricted fluid flow between the first and second ports, the valve including:
      a first valve element including a second fluid communication passage, a first seal, and a second seal, the second fluid communication passage providing the restricted fluid flow between the first and second ports, at least one of the first and second seals having an annular lip projecting obliquely toward the axis in the first configuration, and the first seal engaging the housing in the second and intermediate configurations; and
      a second valve element positionable between first and second arrangements with respect to the first valve element, the first arrangement including the second valve being spaced from the second seal in the intermediate configuration, and the second arrangement including the second valve engaging the second seal in the second configuration.

17. The valve structure according to claim 16, wherein the annular lip comprises a hollow frustum.

18. A valve structure comprising:
   a housing including a first fluid communication passage between a first port and a second port; and
   a valve movable with respect to the housing between a first configuration, a second configuration, and an intermediate configuration between the first and second configurations, the first configuration permitting substantially unrestricted fluid flow between the first and second ports, the second configuration substantially preventing fluid flow between the first and second ports, and the intermediate configuration providing restricted fluid flow between the first and second ports, the valve including:
      a first valve element including a second fluid communication passage, a first seal, and a second seal, the second fluid communication passage including at least one orifice penetrating the first valve element and providing the restricted fluid flow between the first and second ports, and the first seal engaging the housing in the second and intermediate configurations; and
      a second valve element positionable between first and second arrangements with respect to the first valve element, the first arrangement including the second valve being spaced from the second seal in the intermediate configuration, and the second arrangement including the second valve engaging the second seal in the second configuration.

19. A valve for controlling fuel vapor pressure in a fuel tank, the valve comprising:

a housing including an inlet port and an outlet port;

an electromagnetic actuator including a stator and an armature, the stator being fixed with respect to the housing, and the armature being displaceable along an axis with respect to the stator;

a first valve element being fixed with respect to the armature and being displaceable along the axis with respect to the housing, the first valve element including a first disk;

a second valve element being displaceable along the axis with respect to the housing and with respect to the first valve element, the second valve element including a second disk and at least one aperture penetrating the second disk, the at least one aperture extending generally parallel to the axis;

a first resilient element extending between the housing and the second valve element, the first resilient element opposing an actuating force of the electromagnetic actuator;

a second resilient element extending between the first and second valve elements, the second resilient element opposing displacement of the second body toward the first body;

whereby there are a plurality of configurations of the first and second valve elements with respect to the housing, the plurality of configurations including:

a first configuration permitting substantially unrestricted fuel vapor flow from the inlet port to the outlet port, the first configuration including the second valve element being spaced from the housing such that fluid communication is permitted between the inlet and outlet ports via a gap between the second disk and the housing, and including the first valve element being the spaced from the second valve element such that fluid communication is permitted between the inlet and outlet ports via the at least one aperture penetrating the second disk;

a second configuration substantially preventing fuel vapor flow from the inlet port to the outlet port, the second configuration including the second valve element engaging the housing such that the gap is closed, and including the second valve element engaging the first valve element such that fluid communication between the inlet and outlet ports is prevented via the at least one aperture penetrating the second disk; and a third configuration providing restricted fuel vapor flow from the inlet port to the outlet port, the third configuration including the second valve element engaging the housing such that the gap is closed, and including the first valve element being the spaced from the second valve element such that fluid communication is permitted between the inlet and outlet ports via the at least one aperture penetrating the second disk.

20. The valve according to claim 19, further comprising:

a first seal surrounding the axis and the at least one aperture, the first seal sealing the second disk with respect to the housing in the second and third configurations; and a second seal surrounding the axis and the at least one aperture, the second seal sealing the first disk with respect to the second disk in the second configuration.

21. The valve according to claim 19, wherein the first resilient element comprises a first coil spring centered around the axis, the second resilient element comprises a second coil spring centered around the axis, and the second coil spring has a greater spring rate relative to the first coil spring.

22. The valve according to claim 19, further comprising:

a flange fixed with respect to the armature such that the second valve element is constrained to move along the axis between the flange and the first valve element.

* * * * *